April 24, 1962

G. A. TINNERMAN 3,031,217

BRACKETS AND BRACKET ANCHORING DEVICES

Filed June 8, 1959

INVENTOR
GEORGE A. TINNERMAN

BY Featherstonhaugh & Co.
ATTORNEYS

United States Patent Office 3,031,217
Patented Apr. 24, 1962

3,031,217
BRACKETS AND BRACKET ANCHORING DEVICES
George A. Tinnerman, 17864 Beach Road, Lakewood, Ohio
Filed June 8, 1959, Ser. No. 818,781
1 Claim. (Cl. 287—54)

This invention relates to improvements in brackets and bracket anchoring devices as are used in frameworks such as partition frameworks and as used, for instance, in the erection of tiers of steel shelves and the like, and wherein the shelves are supported in spaced relationship upon brackets adjustably anchored to the sides of posts or uprights; and the object of the invention is to provide a simplified construction wherein the anchoring arrangement comprises a clamp plate of arched channel shape and formed of relatively light gauge steel and adapted to be inserted within a hollow post having a longitudinal slot in one of its sides, the clamp plate being formed with teeth upon the edges of its flanges for engagement with the inner face of the slotted side of the post under the tightening action of a screw passing through a bracket abutting the outside face of the slotted side of the post and through the slot in the post to enter a threaded orifice in the clamp plate. Upon the screw being tightened it tends to flatten the arch of the clamp plate against its resilient tendency to remain in form and thus causes the teeth upon its flanges to tightly engage the inner face of the slotted side of the post in definite non-slipping relationship.

In comparable arrangements used heretofore the clamp plate consisted of a non-resilient casting and it was therefore necessary to provide serrations upon the inner face of the slotted side of the post for locking reception of the teeth of the clamp plate casting whereas in this invention the provision of serrations in the inner face of the slotted side of the post is totally unnecessary.

A further object of the invention is to form the face of the bracket abutting the post with several integral protuberances adapted to fit within the slot in the post to permit the bracket to adjustably slide upon the post but to retain the bracket against twisting movement relatively to the post.

With the foregoing and other objects in view as shall appear, the invention consists of a bracket and bracket anchoring device formed and arranged all as hereinafter more particularly described and illustrated in the accompanying drawing, in which.

Figure 1:
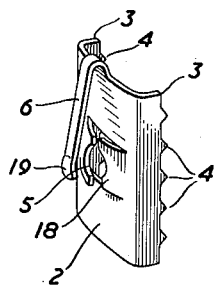
FIG. 1 is a perspective view of the bracket clamp.

The clamp is of channel shape and preferably formed of relatively light gauge steel having a resilient tendency to remain in form and consisting of an arched web 2 having two flanges 3 carrying integral teeth 4 upon their edges. A speed-thread orifice 5 is stamped out of the central portion of the web for the reception of the clamping screw, the web being also formed with a down turned tongue 6 for initially retaining the clamp in place, as shall be hereinafter described.

The bracket to be supported by the clamp is generally of L-shaped integral form consisting of a pair of similar plates 7 and 8 in right angle relationship and each containing a pair of arched protuberances 9 stamped outwardly therefrom, a clamp screw orifice 10 being positioned in each of the plates between its pair of protuberances.

The post or upright 12 to which the bracket is secured is generally of rectangular cross-sectional shape having a flat side 13 containing a centrally disposed slot 14 extending longitudinally of the post and defined by inturned flanges 15, such flanges being of less widths than the widths of the flanges 3 of the clamp so that they do not block the pressure of the clamping action when the clamp is drawn into engagement with the post.

Figure 4:
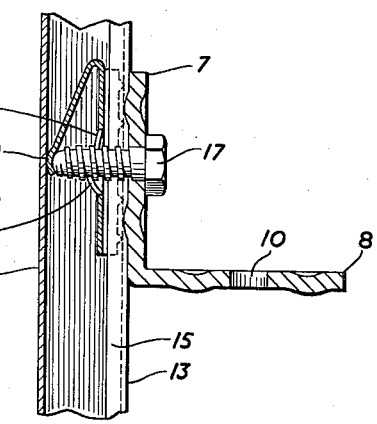
FIG. 4 is a vertical sectional view through the assembly, being taken through the line 4—4, FIG. 3.

In mounting a bracket upon a post, the clamp, as illustrated in FIG. 1, is slid into the desired position within the post 12, the resilient tongue 6 of the clamp bearing against the inner face of the wall 16 of the post to hold the clamp in place. The plate 7 of the bracket is then placed against the side 13 of the post with its protuberances 9 contained within the slot 14, and its orifice 10 opposite the speed-thread orifice 5 in the clamp. A screw 17 is then inserted into the orifice 10 to pass through the slot 14 and enter the speed-thread orifice 5 in threading engagement with its lips 18. Upon the screw being tightened the clamp is drawn towards the bracket and whereby the teeth 4 in the edges of its flanges 3 are brought into biting engagement with the smooth inner face of the side 13 of the post, the tightening of the screw tending to flatten the arch of the clamp web 2 against its resilient tendency to remain in form, and whereby such spring-like tension definitely maintains the assembly against slippage. The tail end of the tongue 6 is formed with a slightly cupped socket 19 which receives the end of the screw 17 when it is tightened up, as shown in FIG. 4, the screw being of such a length that it presses the tail of the tongue 6 tightly against the inner face of the wall 16 of the post and so assists in retaining the assembly in place.

Figure 3:
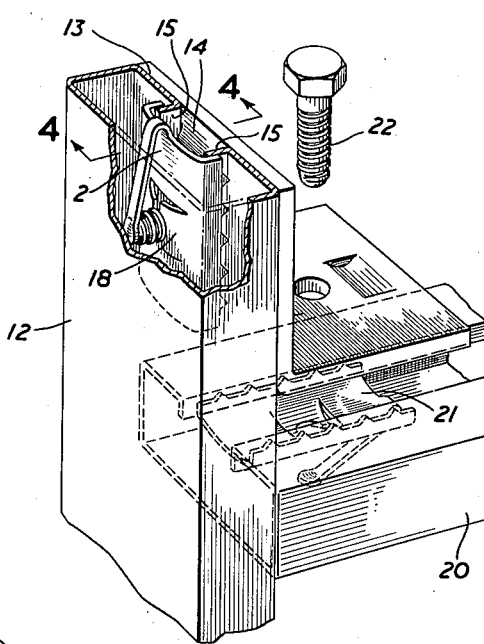
FIG. 3 is a perspective view, partly broken away, of a post, bracket and clamp assembly.
Figure 2:
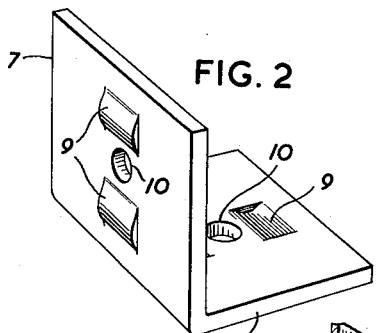
FIG. 2 is a perspective view of the bracket.

For the support of a shelf or the like, a similar assembly to that described is attached to the plate 8 of the bracket, as shown in FIG. 3, and wherein the cross bar 20, clamp 21 and screw 22 are assembled in the same manner as their counter parts previously described. The bracket, of course, may be reversed in position to that shown in FIGS. 3 and 4 as to dispose the plate 8 uppermost with the plate 7 depending below as, for instance, in the joining of an upright post 12 and a cross piece 20 to form the top of a connecting framework and wherein the slot 14 of the cross bar 20 would be disposed on the lower side of the cross bar rather than the upper side.

From the foregoing description it will be apparent that in providing a clamp integrally stamped from substantially resilient sheet steel and wherein the web of the clamp is arched to set up a high post biting action when the screw tension is applied, such an arrangement is a decided improvement over the old-fashioned heavy cast iron non-resilient clamp and its concomitant serrated post surface.

What I claim as my invention is:

A unitary clamp plate formed from a single piece of resilient metal, for clamping a bracket on a holding member, comprising a substantially rectangular transversely arched, resilient plate bent at each side to form side flanges terminating in teeth, a narrow integral resilient tongue projecting from an end of said clamp plate axially aligned with its theoretical central longitudinal axis and reversely bent to overlie the transversely arched portion thereof in inclined angularly spaced apart relation thereto, and terminating in a free end having a cupped portion facing said arched portion, said arched portion of said plate being formed with a central orifice and having a pair of axially aligned tangs struck outwardly therefrom, the free edges of said tangs forming opposite edges of said orifice to constitute a thread engaging nut, the cupped portion of said tongue being disposed in registry with said orifice and engageable by a stud threadedly engaged by the tangs of said orifice said tongue being resiliently engageable with a holding member to urge said teeth into bearing engagement therewith, said arched portion being capable of resiliently urging said teeth into secured biting engagement with a surface, under tension of a threaded stud, threadedly engaged with the tangs of said orifice.

References Cited in the file of this patent

UNITED STATES PATENTS

| | | |
|---|---|---|
| 1,550,701 | Hoyt | Aug. 25, 1925 |
| 2,369,595 | Miles et al. | Feb. 13, 1945 |
| 2,486,723 | Thompson | Nov. 1, 1949 |
| 2,691,552 | Bauman et al. | Oct. 12, 1954 |
| 2,737,268 | Smith | Mar. 6, 1956 |